(12) United States Patent
Champlone

(10) Patent No.: US 9,416,908 B2
(45) Date of Patent: *Aug. 16, 2016

(54) DEPLOYABLE PLUG SYSTEM

(71) Applicant: James Richard Champlone, Medicine Hat (CA)

(72) Inventor: James Richard Champlone, Medicine Hat (CA)

(*) Notice: Subject to any disclaimer, the term of this patent is extended or adjusted under 35 U.S.C. 154(b) by 9 days.

This patent is subject to a terminal disclaimer.

(21) Appl. No.: 14/689,809

(22) Filed: Apr. 17, 2015

(65) Prior Publication Data

US 2015/0240983 A1 Aug. 27, 2015

Related U.S. Application Data

(63) Continuation of application No. PCT/CA2015/000119, filed on Feb. 25, 2015, which is a continuation-in-part of application No. 14/319,623, filed on Jun. 30, 2014, now Pat. No. 9,016,321.

(60) Provisional application No. 61/944,822, filed on Feb. 26, 2014.

(30) Foreign Application Priority Data

Dec. 30, 2014 (CA) .................... 2876710

(51) Int. Cl.
*F16L 55/10* (2006.01)
*F16L 55/12* (2006.01)
(Continued)

(52) U.S. Cl.
CPC ............ *F16L 55/134* (2013.01); *F16L 37/26* (2013.01); *F16L 55/1141* (2013.01)

(58) Field of Classification Search
CPC ....... F16L 55/1141; F16L 55/134; F16K 7/10
USPC ............... 138/29, 89, 90, 92–94; 137/15.15; 73/49.8; 285/33, 128.1, 132.1–133.3, 285/292.1, 325
See application file for complete search history.

(56) References Cited

U.S. PATENT DOCUMENTS 1,889,621 A * 11/1932 Ankarlo ............... F16L 55/124
138/93
2,130,030 A 9/1938 Richardson
(Continued)

FOREIGN PATENT DOCUMENTS

CA 1146879 A 5/1983
CA 1291648 C 11/1991
(Continued)

OTHER PUBLICATIONS

International Search Report mailed on May 27, 2015 in connection with corresponding International PCT Patent Application No. PCT/CA2015/000119, 3 pages.
(Continued)

*Primary Examiner* — Paul R Durand
*Assistant Examiner* — Vishal Pancholi

(57) ABSTRACT

There is disclosed a deployable plug system having an elongated handle assembly with a hollow conduit, a distal end with a conduit connector in fluid communication with the conduit and a hinge assembly having a handle mounting body, and a proximal end. A gas control valve is affixed to the handle assembly at the proximal end, is configured to receive pressurized gas from a source of pressurized gas, and has a valve trigger which selectively applies pressurized gas from the source of pressurized gas to the conduit. The deployable plug system also has a bladder assembly having a bladder mounting body removably connectable to the handle mounting body, a bladder attached to the bladder mounting body, a check valve assembly for allowing pressurized gas from the conduit to enter the bladder, and a check valve assembly connector that selectively connects the check valve assembly to the conduit connector.

24 Claims, 6 Drawing Sheets

(51) Int. Cl.
*F16L 55/134* (2006.01)
*F16L 55/11* (2006.01)
*F16L 37/26* (2006.01)

(56) References Cited

U.S. PATENT DOCUMENTS

| | | | | |
|---|---|---|---|---|
| 2,265,268 A | * | 12/1941 | Culligan | 285/325 |
| 2,327,615 A | * | 8/1943 | Ankarlo | 138/93 |
| 2,843,154 A | * | 7/1958 | Hosking | 138/93 |
| 2,927,603 A | * | 3/1960 | Willis | 137/458 |
| 2,927,609 A | | 3/1960 | Vander Lans | |
| 3,019,819 A | * | 2/1962 | Ankarlo | 138/93 |
| 3,665,966 A | | 5/1972 | Ver Nooy | |
| 3,842,864 A | | 10/1974 | Riegel et al. | |
| 4,076,278 A | * | 2/1978 | Chateau et al. | 285/18 |
| 4,291,727 A | | 9/1981 | Yie et al. | |
| 4,827,984 A | | 5/1989 | Young et al. | |
| 5,076,328 A | * | 12/1991 | Lyon | 138/93 |
| 5,209,266 A | | 5/1993 | Hiemsoth | |
| D358,871 S | * | 5/1995 | Mathison et al. | D23/260 |
| 5,788,291 A | * | 8/1998 | Williams et al. | 285/325 |
| 5,894,863 A | | 4/1999 | Lewis et al. | |
| 6,901,966 B2 | * | 6/2005 | Onuki et al. | 138/93 |
| 7,314,238 B2 | * | 1/2008 | Robert | 285/103 |
| 8,236,883 B2 | | 8/2012 | Zhang et al. | |
| 8,256,467 B1 | | 9/2012 | Larson et al. | |
| 9,016,321 B1 | | 4/2015 | Champlone | |
| 2003/0151251 A1 | * | 8/2003 | Barnoff | 285/123.15 |
| 2008/0163951 A1 | * | 7/2008 | Lundman | 138/93 |

FOREIGN PATENT DOCUMENTS

| | | |
|---|---|---|
| EP | 0695906 A1 | 2/1996 |
| WO | 2009/022120 A2 | 2/2009 |
| WO | 2012/061368 A1 | 5/2012 |

OTHER PUBLICATIONS

Written Opinion of the International Searching Authority mailed on May 27, 2015 in connection with corresponding International PCT Patent Application No. PCT/CA2015/000119, 4 pages.

Search Report issued by the United Kingdom Intellectual Property Office and dated Jun. 8, 2015 in connection with United Kingdom Patent Application No. GB1507241.6, 1 page.

Jim Champlone, Deployable Culvert Plug System, uploaded to YouTube on May 20, 2014, https://www.youtube.com/watch?v=ShK0QgfK6fM 1 page.

Jim Champlone, Deployable Culvert Plug System, dated 2014, retrieved on Jun. 30, 2015 from https://forsalebyinventor.com/products/portfolio-item/deployable-culvert-plug-system/ 1 page.

\* cited by examiner

DEPLOYABLE PLUG SYSTEM

RELATED APPLICATIONS

This application is a continuation of PCT International Patent Application No. PCT/CA2015/000119, which was filed in the Canadian Receiving Office on Feb. 25, 2015. PCT International Patent Application No. PCT/CA2015/000119 claims the benefit of and priority to U.S. Provisional Patent Application No. 61/944,822, which was filed Feb. 26, 2014, is a continuation-in-part of U.S. patent application Ser. No. 14/319,623, which was filed Jun. 30, 2014, and claims the benefit of and priority to Canadian Patent Application No. 2,876,710, which was filed on Dec. 30, 2014. The entire disclosures of PCT International Patent Application No. PCT/CA2015/000119, U.S. Provisional Patent Application No. 61/944,822, U.S. patent application Ser. No. 14/319,623, and Canadian Patent Application No. 2,876,710 are hereby incorporated herein by reference.

FIELD

Embodiments of the present invention may relate to environmental remediation devices. For example, embodiments of the present invention may include plugs having inflatable bladders that may seal openings after a hazardous material spill.

BACKGROUND

Bodies of water are highly vulnerable to the detrimental effects of exposure to oil and other hazardous chemical spills. While highly publicized hazardous chemical spills are usually associated with chemical spills into large bodies of water such as lakes or oceans, smaller spills occur far more frequently at locations such as drilling sites, factories, and tanker truck accidents. Such smaller hazardous chemical spills can quickly travel along roadside ditches into culverts and streams and from there into adjacent water supplies to cause even more damage and destruction.

Unfortunately, there are surprisingly few ways to stop or control hazardous chemical spills from traveling along ditches and culverts. Often, spilled hazardous chemicals disperse from a spill site before remediation efforts can be implemented. Accordingly, there exists a need for devices by which oil and other chemical spills can be prevented from dispersing to enable remediation efforts to be taken. In particular, a new system that contains and controls oil and other hazardous chemicals spills along culverts and other pipes would be beneficial. Ideally such a system would provide a quick, easy, and effective approach to containing oil and other hazardous chemicals spills to enable remediation. Preferably such a system could be quickly installed safely and efficiently by one man. In practice a rugged, reusable system would be particularly beneficial.

SUMMARY

Embodiments of the present invention include devices by which oil and other chemical spills can be prevented from dispersing to enable remediation efforts to be taken. In particular, embodiments of the present invention may contain and control oil and other hazardous chemicals spills along culverts to enable remediation.

According to one embodiment, there is disclosed a deployable plug system, comprising: an elongated handle assembly having a hollow conduit, a distal end with a conduit connector in fluid communication with the conduit and a hinge assembly having a handle mounting body, and a proximal end, wherein a gas control valve is affixed to the handle assembly at the proximal end, and wherein the gas control valve is configured to receive pressurized gas from a source of pressurized gas, the gas control valve further including a valve trigger which selectively applies pressurized gas from the source of pressurized gas to the conduit; and a bladder assembly having a bladder mounting body removably connectable to the handle mounting body, a bladder attached to the bladder mounting body, a check valve assembly for allowing pressurized gas from the conduit to enter the bladder, and a check valve assembly connector that selectively connects the check valve assembly to the conduit connector.

In some embodiments, the conduit connector is a junction block comprising a block.

In some embodiments, the block has a slot that extends along the block from a front opening, and the handle assembly includes a gas aperture that passes from the conduit into the slot.

In some embodiments, the check valve assembly connector includes a hose that selectively connects the check valve to the junction block to communicate pressurized gas from the conduit to the bladder.

In some embodiments, the hose selectively connects to the junction block using a disc-shaped sealing ring which slides into the slot.

In some embodiments, the hose connects to the sealing ring and forms a seal with the junction block when the hose fits over the gas aperture.

In some embodiments, the deployable plug system further includes a release rod slidingly affixed to the handle assembly which may extend into the junction block.

In some embodiments, the release rod can push the sealing ring out of the slot.

In some embodiments, the check valve assembly connects to the hose using a barbed fitting.

In some embodiments, the source of pressurized gas is a removable compressed-gas canister that can be retained by the gas control valve.

In some embodiments, the compressed-gas canister is threadably connectable to the gas control valve.

In some embodiments, the gas canister contains compressed $CO_2$.

In some embodiments, the gas canister contains compressed $N_2$.

In some embodiments, the check valve assembly includes a one way check valve that allows gas to enter but not leave the bladder.

In some embodiments, the check valve assembly further includes a relief valve to enable pressurized gas to escape the bladder.

In some embodiments, the hinge assembly includes a fastener assembly that locks the hinge assembly relative to the handle assembly.

In some embodiments, the handle mounting body and the bladder mounting body include interlocking features.

In some embodiments, the handle mounting body is a handle mounting plate and the bladder mounting body is a bladder mounting plate.

In some embodiments, the handle mounting plate includes a male feature, the bladder mounting plate includes a female feature, and the handle mounting plate can be locked into the bladder mounting plate by moving up and released by moving down.

In some embodiments, the male feature has a "T" cross-sectioned.

In some embodiments, the handle assembly has a handle on the proximal end of the handle assembly.

In some embodiments, the valve trigger is disposed adjacent the handle.

In some embodiments, the handle includes grip features.

In some embodiments, the bladder expands in length and width when filled with pressurized gas.

In some embodiments, the bladder includes ribs.

In some embodiments, the bladder is comprised of rubber.

In some embodiments, the handle mounting body and the bladder mounting body are configured to permit the handle assembly to be attached to and detached from the bladder assembly by sliding the distal end of the handle assembly relative to the bladder assembly.

In some embodiments, the conduit connector and the check valve assembly connector are configured to permit the conduit to be attached to and detached from the check valve assembly by sliding the distal end of the handle assembly relative to the bladder assembly.

A deployable culvert plug system according to another embodiment includes an elongated handle assembly having a hollow conduit, a distal end with a junction block in fluid communication with said conduit and a hinge assembly having a handle mounting plate, and a proximal end having a handle and a gas control valve for retaining a removable gas cylinder containing a pressurized gas. The gas control valve further includes a valve trigger which selectively applies pressurized gas to the conduit. The deployable culvert plug system further includes a bladder assembly having a bladder mounting plate that is removably connected to the handle mounting plate, a bladder that is attached to the bladder mounting plate, a check valve assembly for allowing pressurized gas to enter the bladder, and a hose that selectively connects the check valve assembly to the junction block. In use the handle assembly enables a user to deploy the bladder and the valve trigger selectively applies pressurized gas from a removable gas cylinder through the conduit, through the hose, through the check valve and into the bladder.

In some embodiments, the removable gas cylinder threads onto the gas control valve and the pressurized gas is $CO_2$. In some embodiments, the check valve assembly connects to the hose using a barbed fitting and the check valve assembly includes a check valve that allows gas to enter but not leave the bladder. The check valve assembly in some embodiments further includes a relief valve to enable pressurized gas to escape from the bladder.

In some embodiments, the hinge assembly includes a fastener assembly that locks the hinge assembly relative to the handle assembly and the handle mounting plate and the bladder mounting plate include interlocking features. The handle mounting plate may include a male feature, the bladder mounting plate may include a female feature, and the handle mounting plate can be locked into the bladder mounting plate by moving up and released by moving down. The male feature may be "T" cross-sectioned. The valve trigger may be disposed adjacent said handle and the handle may include grip features.

In some embodiments, the junction block is comprised of a block having a slot that extends along the block from a front opening, and the handle assembly includes a gas aperture that passes from the conduit into the slot. The hose in some embodiments connects to the junction block using a disc-shaped sealing ring which slides into the slot. The sealing ring in some embodiments connects to the hose and forms a seal with the junction block when the hose fits over the gas aperture. In some embodiments, a release rod is slidingly affixed to the handle assembly and extends into the junction block. That release rod may push the sealing ring out of the slot.

In some embodiments, the bladder expands in length and width when filled with pressurized gas. In some embodiments, the bladder includes ribs and is comprised of rubber.

BRIEF DESCRIPTION OF THE DRAWINGS

Some potential advantages and features of embodiments of the present invention will become better understood with reference to the following more detailed description and claims taken in conjunction with the accompanying drawings in which like elements are identified with like symbols and in which:

Figure 1:
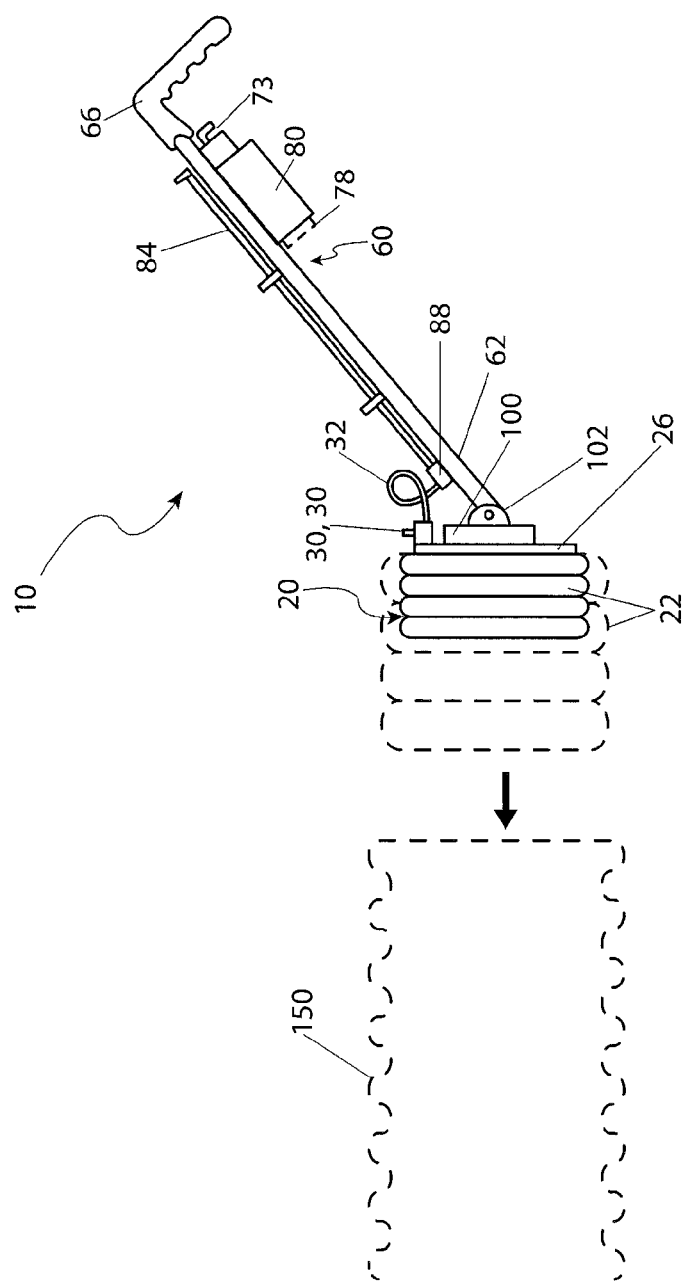
FIG. 1 is an environmental view of a deployable plug system 10 according to an embodiment of the present invention.

DESCRIPTIVE KEY 10 deployable plug system
20 bladder assembly
22 bladder
24 ribs
26 bladder mounting plate
27 female locking feature
30 check valve
31 relief valve
32 first hose
34 sealing ring
60 handle assembly
62 handle
63 conduit
66 grip
67 finger relief
73 gas control valve
75 valve trigger
77 female threads
78 gas canister
79 male threads
80 guard cylinder
82 cylinder aperture
84 hose release rod
85 rod brackets
86 rod trigger
88 hose junction block
89 slot
90 front opening
91 gas aperture
92 rod aperture
100 handle mounting plate
102 hinge assembly
103 fastener assembly
106 male locking features
150 culvert pipe

DETAILED DESCRIPTION

An embodiment of the present invention is depicted within FIGS. 1-6. However, embodiments of the invention are not limited to what is specifically illustrated and described. A person skilled in the art will appreciate that many other embodiments of the invention are possible without deviating from the basic concept of the invention. Any such work around also falls with the scope of this invention.

The terms "a" and "an" herein do not denote a limitation of quantity, but rather denote the presence of at least one of the referenced items. In addition, unless otherwise denoted all directional signals such as up, down, left, right, inside, outside are taken relative to the illustration shown in FIG. 1.

Figure 2:
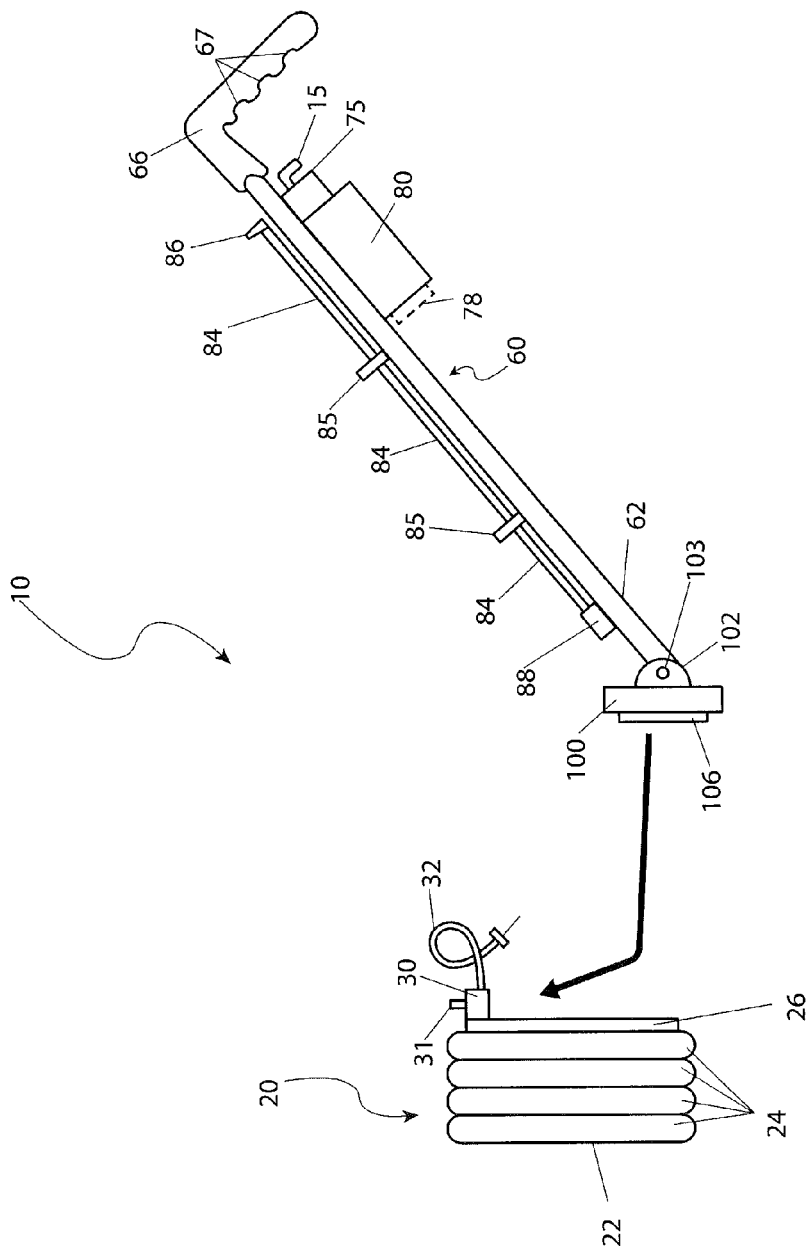
FIG. 2 is an exploded view of the deployable plug system 10 shown in FIG. 1.

FIGS. 1 and 2 respectively illustrate environmental and exploded views of a deployable plug system 10 according to an embodiment of the present invention. When installed the deployable plug system 10 prevents fluid flow into and out of a culvert pipe 150 after a hazardous material spill, although alternative embodiments may prevent fluid flow into or out of other openings such as openings of manholes, catch basins, or other pipes for example. As shown in FIGS. 1 and 2 the deployable plug system 10 includes a bladder assembly 20 that is removably attached to a handle assembly 60. As described in more detail subsequently the handle assembly 60 enables a user to stand above and beside the culvert pipe 150 while positioning the bladder assembly 20 into the opening of the culvert pipe 150.

Referring now to FIGS. 1, 2, and 4-6 as required, the handle assembly 60 is configured to receive pressurized gas from a pressurized gas source, which in the embodiment shown is a threaded removable pressurized gas canister 78 in a threaded gas control valve 73. The gas canister 78 may include a pressure regulator to regulate pressure of pressurized gas released from the gas canister 78. Also, the gas canister 78 may contain compressed non-flammable, non-poisonous, inert, and environmentally-friendly gas, such as compressed carbon dioxide ("$CO_2$") or compressed nitrogen ("$N_2$") gas for example, and some or all of the compressed gas may be liquefied. In other embodiments, the handle assembly 60 may retain other gas cylinders, canisters, or containers, or may receive pressurized gas from still other pressurized gas sources. Also, in other embodiments, the compressed gas may include other non-flammable, non-poisonous, inert, and environmentally-friendly gases such as air, argon, helium, or neon, or any combination of two or more of carbon dioxide, nitrogen, air, argon, helium, and neon. Compressed gases are available from various commercial sources, such as Matheson and Air Liquide for example, and costs and potential health hazards may be considerations when choosing a gas or mixture of gasses.

When a user operates a valve trigger 75 of the gas control valve 73 pressurized gas in the gas canister 78 passes down a hollow center conduit 63 of the handle assembly 60 and into the bladder assembly 20. This is described in more detail below. As the gas fills the bladder assembly 20 a bladder 22 expands in length and width. If the bladder 22 is inside the culvert pipe 150 the bladder 22 expands against the wall of the culvert pipe 150 to form a seal which prevents water as well as spilled hazardous materials from entering or leaving the culvert pipe 150. As a person skilled in the art will appreciate, the material of the bladder 22 and of the wall of the culvert pipe 150 will have a coefficient of friction such that frictional force between the bladder 22 and the wall of the culvert pipe 150 will generally be proportional to the outward force that the bladder 22 exerts on the wall of the culvert pipe 150, and the outward force that the bladder 22 exerts on the wall of the culvert pipe 150 will depend on the pressure of gas in the bladder 22. Therefore, in general, the pressure of the pressurized gas from the gas canister 78 should be sufficient to cause the bladder 22 to exert a sufficient outward force on the wall of the culvert pipe 150 to maintain the seal between the bladder 22 and the wall of the culvert pipe 150 when under external pressure from water or other substance or substances that the bladder 22 blocks from entering or leaving the culvert pipe 150.

Figure 3:
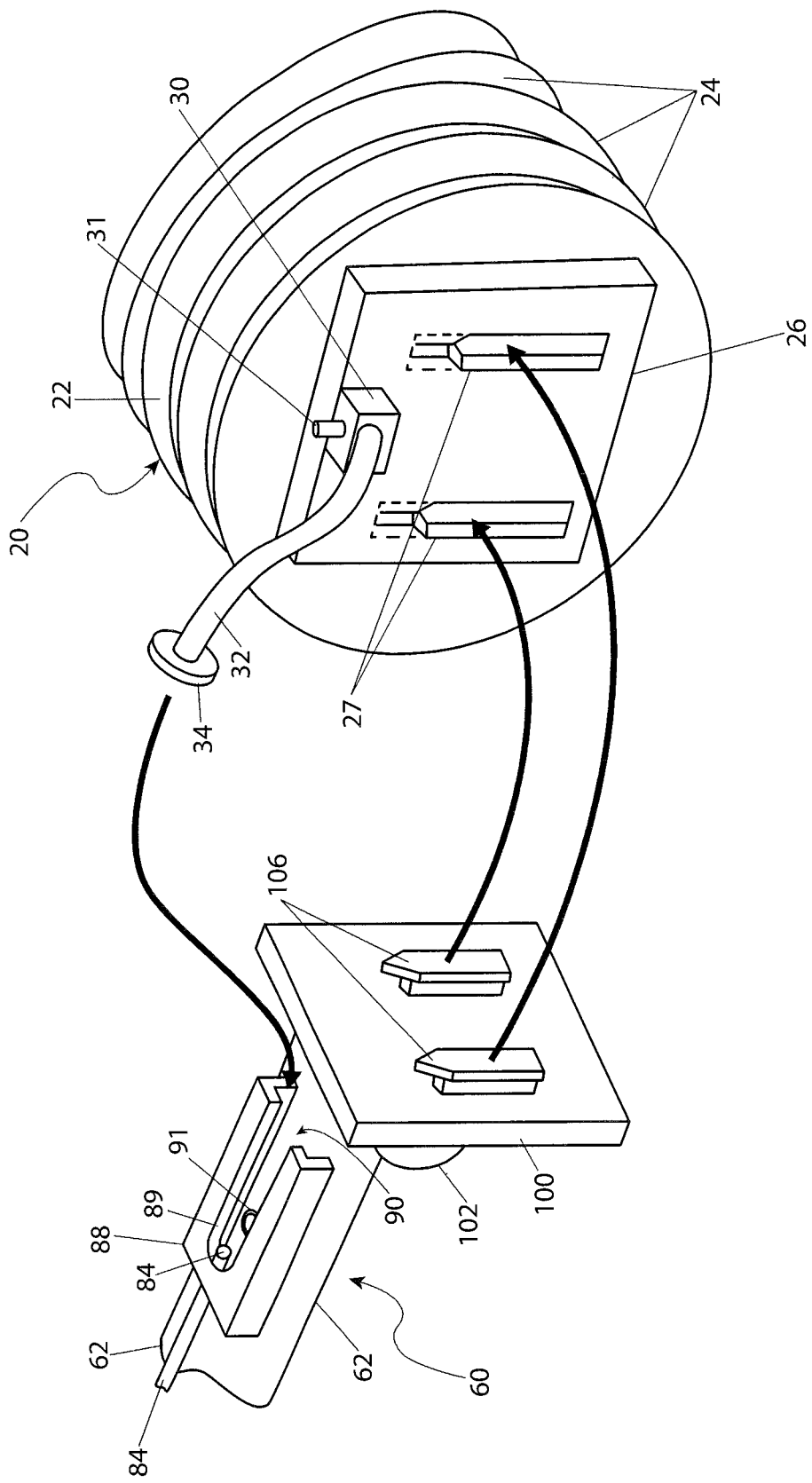
FIG. 3 is a perspective view of parts of a bladder assembly 20 and handle assembly 60 used in the deployable plug system 10 shown in FIGS. 1 and 2.
Figure 4:
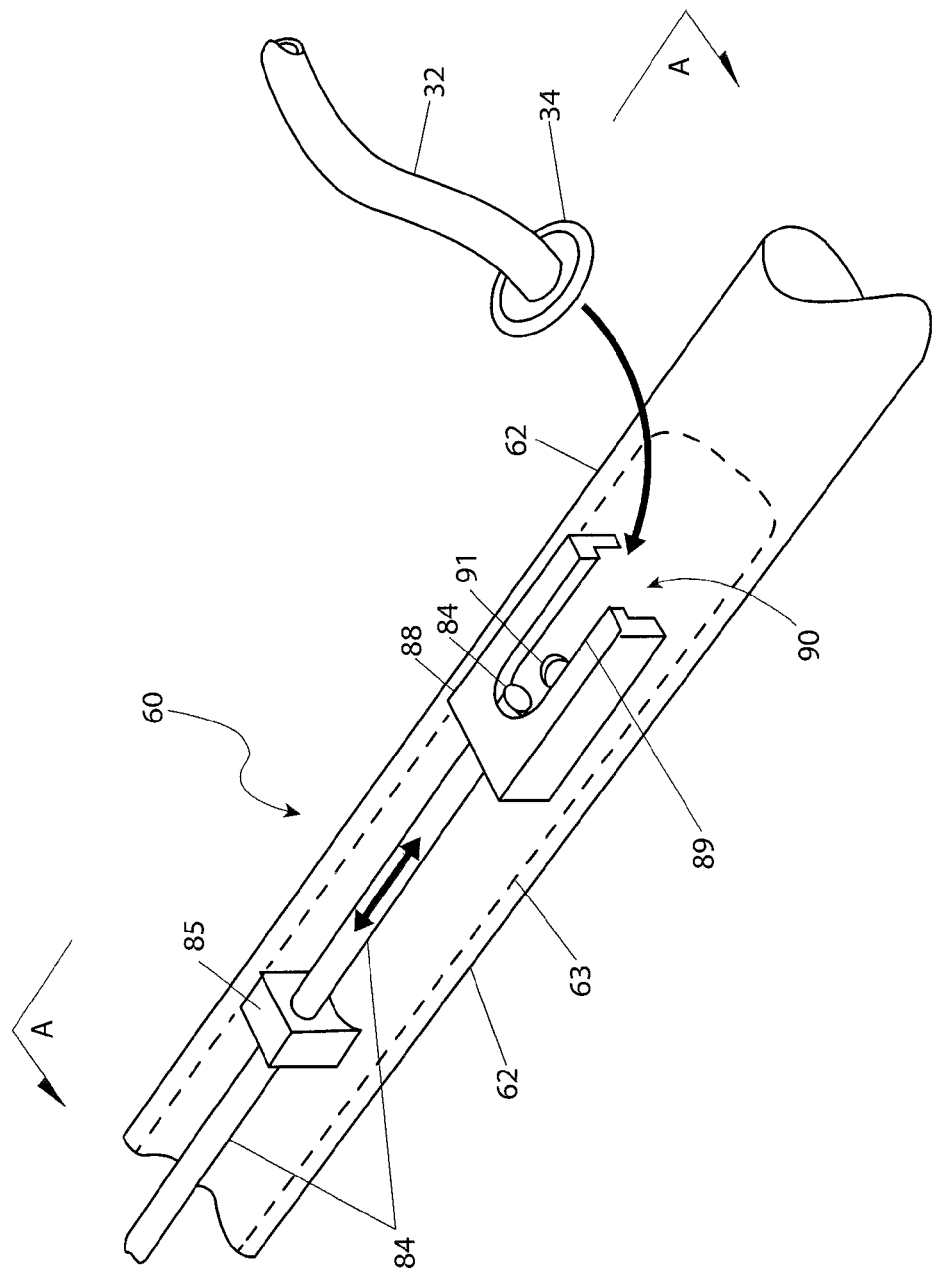
FIG. 4 is a close-up perspective view of a hose junction block 88 used in the deployable plug system 10 shown in FIGS. 1 and 2.
Figure 5:
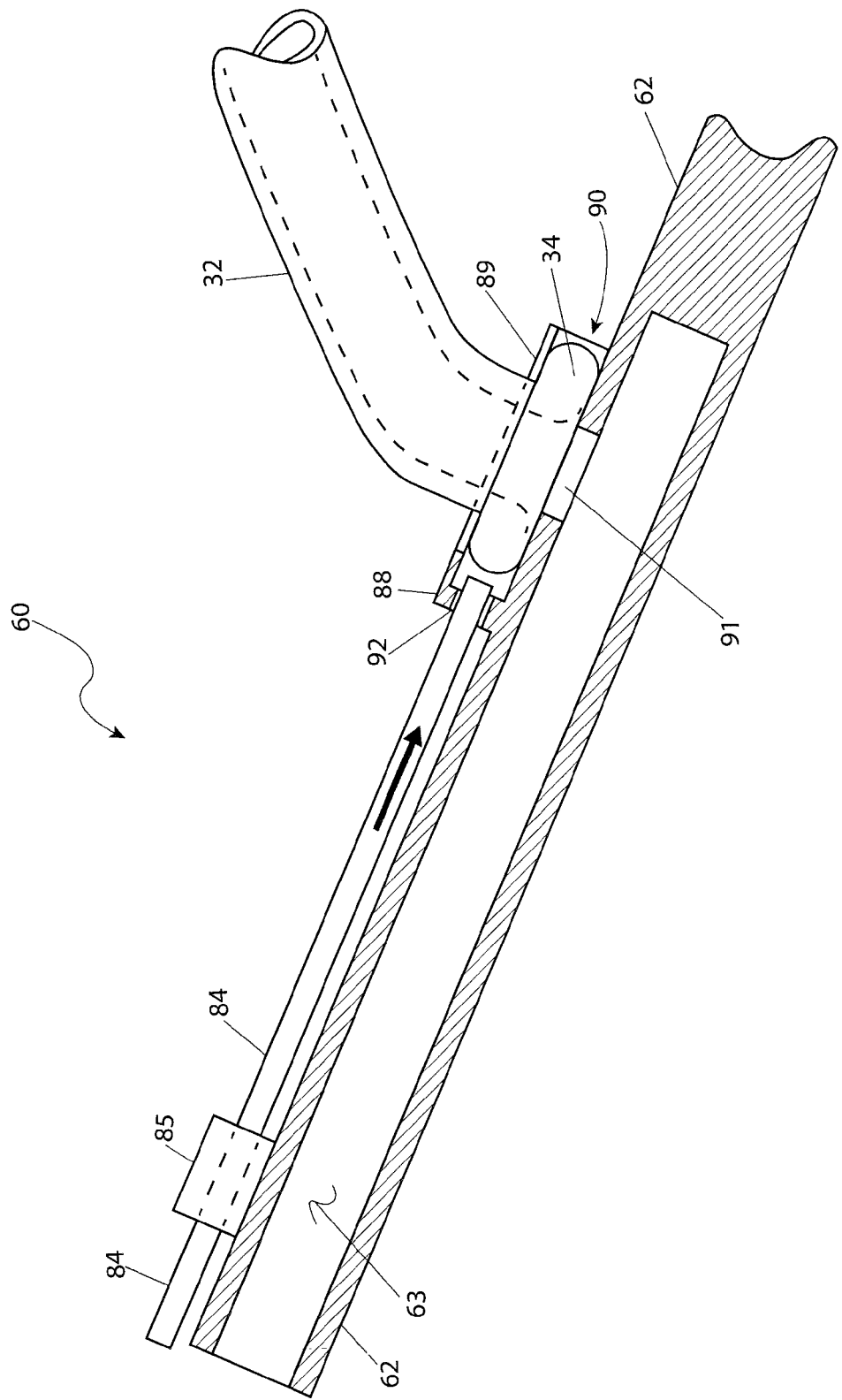
FIG. 5 is a sectional view of the hose junction block 88 taken along section line A-A of FIG. 4; and, FIG. 6 is a perspective view of the proximal end of the handle assembly 60.

Referring now primarily to FIGS. 1-3, the bladder assembly 20 includes a unidirectional check valve 30 that is integral or attached to a bladder mounting body, which in the embodiment shown is a bladder mounting plate 26. The check valve 30 allows gas to enter but not leave the bladder 22. The bladder assembly 20 also includes an integral "poppet-type" relief valve 31 that enables gas inside the bladder 22 to be let out. The handle assembly 60 is attachable to and detachable from the bladder mounting plate 26 (as is discussed in more detail subsequently) to enable the inflated bladder assembly 20 to remain in the culvert pipe 150 while the handle assembly 60 is detached. When remediation is complete, the handle assembly 60 is re-attached to the bladder assembly 20 which is then deflated by depressing the relief valve 31. When the bladder assembly 20 is sufficiently deflated it can be removed from the culvert pipe 150 to allow water to again flow through the culvert pipe 150.

It is envisioned that the bladder assembly 20 and the bladder 22 would be made available in multiple sizes and shapes to fit corresponding sizes of culvert pipes or other openings such as openings of manholes, catch basins, or other pipes for example. In fact it is envisioned that the bladder assembly 20 and its bladder 22 can be used for applications that range from small culverts under residential driveways to those through highway bypasses. Furthermore, it is also envisioned that the deployable plug system 10 could be used to temporarily seal manholes and other similar structures, or more generally various different pipes for example. Thus the specific application of sealing culvert pipes 150 should not necessarily be interpreted as a limiting factor of the deployable plug system 10.

Referring once again to FIGS. 1 and 2, the handle assembly 60 includes a hinge assembly 102 that enables adjustment of the relative angle between the elongation axis of the handle assembly 60 and the bladder assembly 20. The hinge assembly 102 enables a user to be safely positioned along an embankment or other stable surface adjacent the culvert pipe 150 while installing the deployable plug system 10 into the culvert pipe 150. The hinge assembly 102 is envisioned as having a pivot that is integrally-molded or otherwise affixed to a handle mounting body, which in the embodiment shown is a handle mounting plate 100, such that the handle mounting plate 100 is pivotally connected to the handle 62. Turning now specifically to FIG. 2, the handle mounting plate 100 is connected to the hinge assembly 102 by a fastener assembly 103 which selectively locks the hinge assembly 102 relative to the handle assembly 60. The fastener assembly 103 can be as simple as a bolt and a nut. In use, the handle mounting plate 100 is rotated by the user to a desired angle with the handle 62 and is then locked in position by the user tightening the fastener assembly 103. This rigidly connects the handle mounting plate 100 in place to allow it to be used to insert the bladder assembly 20 into the culvert pipe 150.

Except for the bladder 22 (which is rubber in the embodiment shown) the other major components of the deployable plug system 10 are envisioned as being made of economic and light-weight plastic materials. However, other materials such as stainless steel, aluminum, and the like may also be used with benefit based upon a user's preference and the requirements of a particular remediation.

Refer now primarily to FIG. 3 for a perspective view of the bladder assembly 20 and the lower end of the handle assembly 60. As previously noted the bladder assembly 20 includes the bladder mounting plate 26 and the handle assembly 60 includes the handle mounting plate 100. In practice the bladder mounting plate 26 is adhesively or otherwise securely affixed to one end of the bladder 22. The handle mounting plate 100 is attached to the handle assembly 60.

Still referring to FIG. 3, the bladder mounting plate 26 includes a pair of female locking features 27 and the handle mounting plate 100 includes a pair of interlocking male locking features 106. The male locking features 106 are vertically parallel "T" cross-sectioned shapes that can be inserted into vertically parallel openings of the female locking features 27 in a tab-and-slot fashion. When inserted into the female locking features 27 the male locking features 106 can be slide upward to lock into place and then downward to release.

Still referring to FIG. 3, the bladder assembly 20 also includes a check valve assembly connector, which in the embodiment shown is a high-pressure hose 32, that connects to the check valve 30 via a barbed fitting or by another highly reliable leak-proof attachment. The check valve 30 is a one way valve that allows gas to enter the bladder 22 but prevents gas leakage when the handle assembly 60 is removed as is described subsequently. The hose 32 enables the gas to pass into the check valve 30 and thus into the bladder 22.

The bladder 22 is envisioned as being a generally cylinder-shaped structure made of a heavy-duty rubber that is capable of resisting damage from sharp features that might be found in the culvert pipe 150. The bladder 22 has an exterior surface made up of generally parallel semi-circular ribs 24 which when inflated expand in overall length and diameter. This causes the ribs 24 to align with internal radial features of the culvert pipe 150 to form a seal. However, other embodiments may not include ribs 24. For example, bladders intended to seal smooth inner surfaces of pipes, manholes, or catch basins bladders may have a smooth surface to seal such smooth inner surfaces.

Still referring to FIG. 3, the hose 32 also connects to a conduit connector, which in the embodiment shown is a hose junction block 88 that is located near the distal end of the handle assembly 60. The hose junction block 88 is a boxlike structure integrally molded or otherwise permanently affixed to the handle assembly 60. The hose 32 connects to the hose junction block 88 using an integrally-molded disc-shaped sealing ring 34 which slides into a slot 89 of the hose junction block 88. The slot 89 extends between a rectangular front opening 90 to a circular rear rod aperture 92.

The slot 89 is dimensioned to receive the sealing ring 34 to form a seal. The front opening 90 is dimensioned to allow the sealing ring 34 to enter the slot 89. When fully inserted into the slot 89 the hose 32 and sealing ring 34 are located over a gas aperture 91 that passes through the conduit 63 of the handle 62 into the slot 89. This enables gas injected into the conduit 63 to pass into the first hose and then into the bladder assembly 20. Thus, the bladder assembly 20 and the handle assembly 60 are mechanically coupled together by the male locking features 106 and by the female locking features 27 and in fluid communications via the hose 32.

Figure 6:
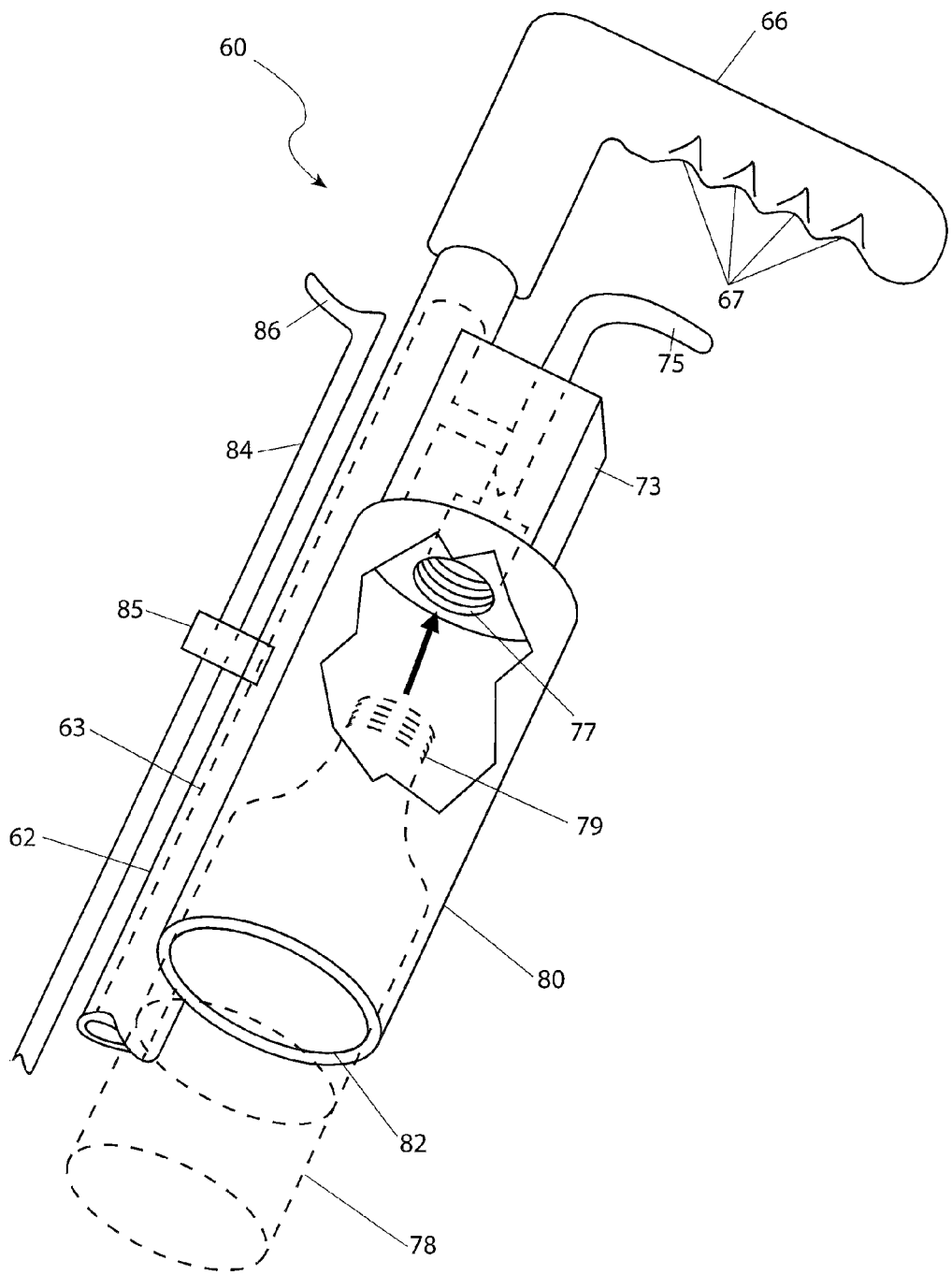

Turning back to FIGS. 1 and 2 as well as to FIG. 6, when the gas control valve 73 releases pressurized gas from the gas canister into the conduit 63 of the handle 62, that gas fills the conduit 63, passes through the gas aperture 91 into the hose 32, then passes through the check valve 30, and enters and inflates the bladder 22. In addition, the sealing ring 34 provides a gas tight seal between the hose 32 and the gas aperture 91 and hose junction block 88 while the check valve 30 only allows to enter but not leave the bladder 22.

The configuration of the hose junction block 88 with its slot 89 and the hose 32 with its sealing ring 34 enable a user to rapidly detach the hose 32 from the handle assembly 60. Referring now to FIGS. 1-5, to that end the handle assembly 60 includes a sliding hose release rod 84. That hose release rod 84 extends from near the top of the handle 62 into the rod aperture 92 of the hose junction block 88. The hose release rod 84 is held to the handle 62 using linearly aligned rod brackets 85.

The handle assembly 60 is detached from the hose 32 by the user pressing down on a rod trigger 86 of the hose release rod 84 (see FIG. 6). This moves the hose release rod 84 down, causing its lower end to slide through the rod aperture 92 to contact and push the sealing ring 34 down the slot 89 and out the front opening 90. The bladder mounting plate 26 and the handle mounting plate 100 can then be detached from each other by lowering and withdrawing the male locking features 106 from the female locking features 27. The handle assembly 60 is then fully disconnected from the bladder assembly 20 and may then be removed. More generally, in various embodiments such as those described herein, the handle assembly may be fully decoupled from the bladder assembly by sliding the distal end of the handle assembly relative to the bladder assembly to disconnect the handle mounting body (the handle mounting plate 100 in the embodiment shown) from the bladder mounting body (the bladder mounting plate 26 in the embodiment shown), and to disconnect the conduit connector (the hose junction block 88 in the embodiment shown) from the check valve assembly connector (the high-pressure hose 32 in the embodiment shown), which may facilitate decoupling the handle assembly from the bladder assembly when compared to other devices. In other embodiments, the distal end of the handle assembly may slide relative to the bladder assembly in directions other than in the embodiment shown.

The bladder assembly 20 can remain within the culvert pipe 150 until the remediation project is complete. When remediation is complete the handle assembly 60 is re-attached to the bladder assembly 20 by inserting the male locking features 106 into the female locking features 27 and then locking the male locking features 106 in place by sliding them upward. The bladder assembly 20 is then deflated by pushing down on the relief valve 31 until the bladder assembly 20 can be removed from the culvert pipe 150. Again, more generally in various embodiments such as those described herein, the handle assembly may be reattached to the bladder assembly to remove the bladder assembly from an opening by sliding the distal end of the handle assembly relative to the bladder assembly to connect the handle mounting body (the handle mounting plate 100 in the embodiment shown) from the bladder mounting body (the bladder mounting plate 26 in the embodiment shown), which may facilitate reattaching the handle assembly from the bladder assembly when compared to other devices. Again, in other embodiments, the distal end of the handle assembly may slide relative to the bladder assembly in directions other than in the embodiment shown.

FIG. 6 presents a more detailed view of the handle assembly 60 and its gas canister 78. The proximal end of the handle assembly 60 receives the gas canister 78. The handle assembly 60 includes a grip 66, the gas control valve 73, a spring-returned valve trigger 75, and a guard cylinder 80. The grip 66 enables the user to grasp the deployable plug system 10 securely while positioning the bladder assembly 20 within a culvert pipe 150. The grip 66 is envisioned as being made of a soft high-friction rubber or plastic material having a plurality of recessed finger reliefs 67 to improve gripping and manipulative control.

The gas control valve 73 is envisioned as being integrally-molded or otherwise affixed to the handle assembly 60 adjacent the grip 66. The gas control valve 73 regulates fluid communication into the conduit 63 of the handle 62. The gas control valve 73 is manually activated via the valve trigger 75 to enable gas in the gas canister 78 to be released and to flow into the conduit 63. The valve trigger 75 also closes the conduit 63 to prevent release of contained gas.

Still referring to FIG. 6, the gas control valve 73 includes female threads 77 and a guard cylinder 80. The guard cylinder 80 extends parallel to the handle 62 and has a cylinder aperture 82 that receives the gas canister 78. When inserting a gas canister 78 into the guard cylinder 80 male threads 79 of the gas canister 78 engage the female threads 77 of the gas control valve 73. The guard cylinder 80 covers most of the gas canister 78 but leaves the gas canister 78 with a protruding bottom that enables a user to grasp and rotate the gas canister 78 as required to thread into the gas control valve 73.

The gas canister 78 is envisioned as being a commercially-available product such as a twenty ounce (20 oz.) canister of compressed gas such as $CO_2$ or $N_2$, and the compressed gas may be in a gaseous or liquefied state, or both, or another type of gas cylinder or canister or other gas source that is capable of delivering a volume of gas sufficient to inflate the bladder 22. The gas canister 78 is envisioned as having an internal valve which is opened to deliver pressurized gas upon full engagement of the female 77 and male 79 threads. For larger bladders 22, the check valve 30 of the bladder assembly 20 and the valve trigger 75 of the gas control valve 73 enable a plurality of gas canisters 78 to be attached and emptied without loss of gas in the bladder 22 and conduit 63.

It is envisioned that other styles and configurations of other embodiments the present invention can be easily incorporated into the teachings of this disclosure. While only one particular configuration is shown and described that is for purposes of clarity and disclosure and not by way of limitation of scope.

Embodiments of the present invention can be utilized by the common user in a simple and effortless manner with little or no training. After initial purchase or acquisition the deployable plug system 10, it would be installed in a culvert tube 150 as indicated in FIG. 1. The method of preparing the deployable plug system 10 for use can be performing by: procuring a model of the deployable plug system 10 having a particular size and shape which corresponds to an intended culvert pipe 150 or other similar structure such as a manhole; evacuating gas from the bladder 22 using the relief valve 31 as and if required; joining the bladder assembly 20 to the handle assembly 60 by attaching the bladder and handle mounting plates 26, 100 together by inserting and lifting the male locking features 106 into the female locking features 27; inserting the sealing ring 34 of the hose 32 into the front opening 90 and up the slot 89 of the hose junction block 88 until the sealing ring 34 is centered over the gas aperture 91; inserting a gas canister 78 into the guard cylinder 80; and, engaging and tightening the male threads 79 of the gas canister 78 into the female threads 77 of the gas control valve 73. The deployable plug system 10 is then ready to plug a culvert pipe 150.

The method of installing the deployable plug system 10 within the culvert pipe 150 may be achieved by performing the following steps: safely positioning a user with respect to the culvert pipe 150; selecting a desired relative angle between the bladder assembly 20 and the handle assembly 60 by adjusting the hinge assembly 102 to the desired angle and then securing it in position by tightening the fastener assembly 103; inserting the deflated bladder 22 into the open end of the culvert pipe 150; inflating the bladder 22 by activating the valve trigger 75 of the gas control valve 73 to allow gas to flow through the handle 62 and into the bladder 22 until the bladder 22 is sufficiently expanded and sealed against the inner surfaces of the culvert pipe 150; releasing the valve trigger 75 to close the gas control valve 73; removing the handle assembly 60 from the bladder assembly 20 by detaching the hose 32 from the slot 89 by pushing the hose release rod 84 down; separating the female 27 and male 106 locking features of the bladder mounting plate 26 and the handle mounting plate 100, and, allowing the bladder assembly 20 to remain within the culvert pipe 150 to prevent flow of water and/or contaminants through the culvert pipe 150 until completion of a remediation project.

The method of removing the deployable plug system 10 from the culvert pipe 150 may be achieved by: attaching the handle assembly 60 to the bladder assembly 20 by engaging the female 27 and male 106 locking features of the bladder mounting plate 26 and the handle mounting plate 100 together; pressing the relief valve 31 to release gas from the bladder 22 to deflate the bladder 22; removing the bladder 22 from the culvert pipe 150 using the handle 62 and grip 66; stowing the deployable plug system 10 by removing the gas canister 78 from the guard cylinder 80; washing contaminants from the deployable plug system 10 using appropriate cleaning chemicals and equipment; removing the handle assembly 60 from the bladder assembly 20 as previously described; and deflating the bladder 22 using the relief valve 31 to enable compact storage of the deployable plug system 10 until needed again.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A deployable plug system, comprising:
   an elongated handle assembly having a hollow conduit, a distal end with a conduit connector in fluid communication with said conduit and a hinge assembly having a handle mounting body, and a proximal end, wherein a gas control valve is affixed to the handle assembly at the proximal end, and wherein the gas control valve is configured to receive pressurized gas from a source of pressurized gas, said gas control valve further including a valve trigger which selectively applies pressurized gas from said source of pressurized gas to said conduit;
   a bladder assembly having a bladder mounting body removably connectable to said handle mounting body, a bladder attached to said bladder mounting body, a check valve assembly including a one way check valve that allows pressurized gas from said conduit to enter said bladder but that does not allow gas to leave said bladder, and a check valve assembly connector that selectively connects said check valve assembly to said conduit connector; and
   a release rod including a rod trigger that, when pressed, detaches said check valve assembly from said conduit connector.

2. The deployable plug system of claim 1, wherein said conduit connector is a junction block comprising a block.

3. The deployable plug system of claim 2, wherein said block has a slot that extends along said block from a front opening, and wherein said handle assembly includes a gas aperture that passes from said conduit into said slot.

4. The deployable plug system of claim 3, wherein said check valve assembly connector includes a hose that selectively connects said check valve to said junction block to communicate pressurized gas from said conduit to said bladder.

5. A deployable plug system, comprising:
an elongated handle assembly having a hollow conduit, a distal end with a conduit connector in fluid communication with said conduit and a hinge assembly having a handle mounting body, and a proximal end, wherein a gas control valve is affixed to the handle assembly at the proximal end, and wherein the gas control valve is configured to receive pressurized gas from a source of pressurized gas, said gas control valve further including a valve trigger which selectively applies pressurized gas from said source of pressurized gas to said conduit; and
a bladder assembly having a bladder mounting body removably connectable to said handle mounting body, a bladder attached to said bladder mounting body, a check valve assembly including a one way check valve that allows pressurized gas from said conduit to enter said bladder but that does not allow gas to leave said bladder, and a check valve assembly connector that selectively connects said check valve assembly to said conduit connector;
wherein said conduit connector is a junction block comprising a block;
wherein said block has a slot that extends along said block from a front opening, and wherein said handle assembly includes a gas aperture that passes from said conduit into said slot;
wherein said check valve assembly connector includes a hose that selectively connects said check valve to said junction block to communicate pressurized gas from said conduit to said bladder; and
wherein said hose selectively connects to said junction block using a disc-shaped sealing ring which slides into said slot, and wherein said hose connects to said sealing ring and forms a seal with said junction block when said hose fits over said gas aperture.

6. The deployable plug system of claim 5, further including a release rod slidingly affixed to said handle assembly which extends into said junction block, wherein said release rod can push said sealing ring out of said slot.

7. The deployable plug system of claim 1, wherein said source of pressurized gas is a removable compressed-gas canister that can be retained by the gas control valve.

8. The deployable plug system of claim 1, wherein said check valve assembly includes a relief valve to enable pressurized gas to escape said bladder.

9. The deployable plug system of claim 1, wherein said hinge assembly includes a fastener assembly that locks said hinge assembly relative to said handle assembly.

10. The deployable plug system of claim 1, wherein said handle mounting body and said bladder mounting body include interlocking features.

11. The deployable plug system of claim 1, wherein said handle mounting body is a handle mounting plate and said bladder mounting body is a bladder mounting plate.

12. The deployable plug system of claim 11, wherein said handle mounting plate includes a male feature, wherein said bladder mounting plate includes a female feature, and wherein said handle mounting plate can be locked into said bladder mounting plate by moving up and released by moving down.

13. The deployable plug system of claim 12, wherein said male feature has a "T" cross-sectioned.

14. The deployable plug system of claim 1, wherein said handle assembly has a handle on said proximal end of said handle assembly.

15. The deployable plug system of claim 14, wherein said valve trigger is disposed adjacent said handle.

16. The deployable plug system of claim 14, wherein said handle includes grip features.

17. The deployable plug system of claim 1, wherein said bladder expands in length and width when filled with pressurized gas.

18. The deployable plug system of claim 1, wherein said bladder includes ribs.

19. The deployable plug system of claim 1, wherein the handle mounting body and the bladder mounting body are configured to permit the handle assembly to be attached to and detached from the bladder assembly by sliding the distal end of the handle assembly relative to the bladder assembly.

20. The deployable plug system of claim 1, wherein the conduit connector and the check valve assembly connector are configured to permit the conduit to be attached to and detached from the check valve assembly by sliding the conduit connector relative to the check valve assembly while the bladder mounting body is connected to the handle mounting body.

21. A deployable plug system, comprising:
an elongated handle assembly having a hollow conduit, a distal end with a conduit connector in fluid communication with said conduit and a hinge assembly having a handle mounting body, and a proximal end, wherein a gas control valve is affixed to the handle assembly at the proximal end, and wherein the gas control valve is configured to receive pressurized gas from a source of pressurized gas, said gas control valve further including a valve trigger which selectively applies pressurized gas from said source of pressurized gas to said conduit; and
a bladder assembly having a bladder mounting body removably connectable to said handle mounting body, a bladder attached to said bladder mounting body, a check valve assembly including a one way check valve that allows pressurized gas from said conduit to enter said bladder but that does not allow gas to leave said bladder, and a check valve assembly connector that selectively connects said check valve assembly to said conduit connector;
wherein said conduit connector has a slot that extends from an opening of the slot, wherein said handle assembly includes a gas aperture that passes from said conduit into said slot, wherein said check valve assembly connector includes a hose that selectively connects said check valve to said conduit connector to communicate pressurized gas from said conduit to said bladder, wherein said hose selectively connects to said conduit connector using a sealing body configured to slide into said slot, and wherein said hose connects to said sealing body and forms a seal with said conduit connector when said hose fits over said gas aperture.

22. The deployable plug system of claim 21, further including a release rod configured to detach said check valve assembly from said conduit connector by pushing the sealing body out the opening of the slot.

23. The deployable plug system of claim 21, wherein the sealing body is a sealing ring.

24. The deployable plug system of claim 1, wherein the hollow conduit is formed in a longitudinally extending handle extending from the proximal end of the handle assembly to the distal end of the handle assembly.

\* \* \* \* \*